(12) United States Patent
Pan et al.

(10) Patent No.: US 12,363,596 B2
(45) Date of Patent: Jul. 15, 2025

(54) NODES IN WIRELESS COMMUNICATION SYSTEM AND METHOD PERFORMED THEREBY

(71) Applicant: Samsung Electronics Co., Ltd., Suwon-si (KR)

(72) Inventors: Yu Pan, Beijing (CN); Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 17/732,909

(22) Filed: Apr. 29, 2022

(65) Prior Publication Data

US 2022/0353748 A1 Nov. 3, 2022

(30) Foreign Application Priority Data

Apr. 30, 2021 (CN) .......................... 202110485847.3

(51) Int. Cl.
*H04W 36/00* (2009.01)

(52) U.S. Cl.
CPC ... *H04W 36/0016* (2013.01); *H04W 36/0033* (2013.01); *H04W 36/0079* (2018.08)

(58) Field of Classification Search
CPC ......... H04W 36/0016; H04W 36/0079; H04W 36/0033
USPC ........................................................ 370/388
See application file for complete search history.

(56) References Cited

U.S. PATENT DOCUMENTS

2019/0191344 A1 6/2019 Wen et al.

OTHER PUBLICATIONS

3GPP TSG-RAN WG3 Meeting #111e R3-210216 Jan. 25, 2021 Jan. 25-Feb. 4, 2021.*
Samsung; Discussion on inter-donor IAB node migration procedure for Rel-17 IAB; 3GPP TSG-RAN WG3 Meeting #111e, Jan. 25-Feb. 4, 2021, Online; R3-210216; Jan. 15, 2021.
VIVO; On inter-CU Topology Adaptation Enhancements; 3GPP TSG-RAN WG2 Meeting #113 electronic, Revision from R2-2009330, Jan. 25-Feb. 5, 2021, Online; R2-2100478; Jan. 15, 2021.
Qualcomm Incorporated; (TP for BL CR to 38.401) Inter-donor Topology Adaptation Procedures; 3GPP TSG-RAN WG3 Meeting #111-e, Jan. 25-Feb. 5, 2021, E-meeting; R3-210347; Jan. 14, 2021.
Qualcomm (Moderator); CB#34 IAB_MigrationProcedureDetails, 3GPP TSG-RAN WG3 #111-e, Jan. 25-Feb. 4, 2021, Online; R3-211001; Feb. 5, 2021.
International Search Report with Written Opinion dated Aug. 4, 2022; International Appln. No. PCT/KR2022/005986.

(Continued)

*Primary Examiner* — Sibte H Bukhari
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method performed by a first node in a wireless communication system is provided. The method includes transmitting a first message to a second node, the first message indicating a migration request to migrate a third node, which is connected to the first node, to the second node, receiving a second message in response to the first message from the second node, the second message indicating a response to the migration request, and determining whether the third node can migrate to the second node based on the received second message.

16 Claims, 17 Drawing Sheets

(56) References Cited

OTHER PUBLICATIONS

3GPP; 3rd Generation Partnership Project; Technical Specification Group Radio Access Network; NG-RAN; F1 application protocol (F1AP) (Release 16); 3GPP TS 38.473; V16.5.0; Apr. 2021; Valbonne, France.
Nokia; Summary of Offline Discussion on Reduction of Service Interruption reduction; 3GPP TSG-RAN WG3 #110-e; R3-206856; Online; Nov. 2-12, 2020; Nov. 17, 2020.
CATT; Reducing the Service Interruption for IAB; 3GPP TSG-RAN3 Meeting #110-e; R3-206296; E-meeting; Nov. 2-13, 2020; Oct. 23, 2020.
Nokia et al.; discussion on Inter-Donor IAB Node Migration; 3GPP TSG-RAN WG3 Meeting #110-e; R3-206287; Nov. 2-12, 2020; Online; Oct. 23, 2020.
Extended European Search Report dated Aug. 28, 2024; European Appln. No. 22796120.8-1215 / 4315982 PCT/KR2022005986.

* cited by examiner

NODES IN WIRELESS COMMUNICATION SYSTEM AND METHOD PERFORMED THEREBY

CROSS-REFERENCE TO RELATED APPLICATION(S)

This application is based on and claims priority under 35 U.S.C. § 119(a) of a Chinese patent application number 202110485847.3, filed on Apr. 30, 2021, in the China National Intellectual Property Administration, the disclosure of which is incorporated by reference herein in its entirety.

BACKGROUND

1. Field

The disclosure relates to a field of wireless communication. More particularly, the disclosure relates to nodes in a wireless communication system and methods performed thereby.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding techniques such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also fullduplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

In order to meet an increasing demand for wireless data communication services since a deployment of fourth generation (4G) communication system, efforts have been made to develop an improved 5G or pre-5G communication system. Therefore, the 5G or pre-5G communication system is also called "beyond 4G network" or "post long term evolution (LTE) system".

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebooks, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide nodes in a wireless communication system and methods performed thereby.

Additional aspects will be set forth in part in the description which follows and, in part, will be apparent from the description, or may be learned by practice of the presented embodiments.

In accordance with an aspect of the disclosure, a method performed by a first node in a wireless communication system is provided. The method includes transmitting, to a second node, a first message indicating a migration request to migrate a third node, which is connected to the first node, to the second node, receiving, from the second node, a second message in response to the first message, the second message indicating a response to the migration request, and determining a process for migrating the third node to the second node based on the received second message.

Optionally, the first message includes at least one of first migration mode information or migration cause information.

Optionally, the first migration mode information is used to indicate whether the process for migrating the third node to the second node is a partial migration or a full migration.

Optionally, the second message includes at least one of a migration acceptance indication, a migration rejection indication, second migration mode information or rejection cause information.

Optionally, the second migration mode information is used to indicate whether the process for migrating the third node to the second node is a partial migration or a full migration.

Optionally, the process for migrating the third node to the second node is one of partial migration and full migration.

Optionally, the method further includes receiving, from one of the third node or the second node, a fourth message including a UE context migration start indication, and starting a UE context migration process of a terminal connected to the third node.

Optionally, the method further includes receiving, from one of the third node or the second node, a fifth message including a UE context migration completion indication, and releasing UE context information of the terminal(s).

In accordance with another aspect of the disclosure, a method performed by a second node in a wireless communication system is provided. The method includes receiving, from a first node, a first message indicating a migration request to migrate a third node, which is connected to the first node, to the second node, and transmitting, to the first node, a second message indicating a response to the migration request, wherein the second message is used for the first node to determine a process for migrating the third node to the second node.

Optionally, the first message includes at least one of a first migration mode or a migration cause.

Optionally, the second message includes at least one of a migration acceptance indication, a migration rejection indication, second migration mode information or rejection cause information.

Optionally, each of first migration mode information and the second migration mode information is used to indicate whether the process for migrating the third node to the second node is a partial migration or a full migration.

Optionally, the method further includes in response to receiving a fourth message including a UE context migration start indication from the third node, transmitting the UE context migration start indication to the first node, in order for the first node to start a UE context migration process of a terminal connected to the third node.

Optionally, the method further includes in response to receiving a fifth message including a UE context migration completion indication from the third node, transmitting, to the first node, the UE context migration completion indication for releasing UE context information of the terminal(s) in the first node.

In accordance with another aspect of the disclosure, a method performed by a third node in a wireless communication system is provided. The method includes transmitting, to one of a first node or a second node, a first message including a UE context migration start indication, wherein the third node migrates from a first node to a second node, and wherein the UE context migration start indication is used to start a UE context migration process of a terminal connected to the third node, and after completion of the UE context migration process of the terminal, transmitting, to one of the first node or the second node, a second message including a UE context migration completion indication, wherein the UE context migration completion indication is used to release UE context information of the terminal(s).

In accordance with another aspect of the disclosure, a method performed by a first node in a wireless communication system is provided. The method includes receiving, from one of a third node or a second node, a first message including a UE context migration start indication, the third node having migrated from the first node to the second node, in response to the first message, starting a UE context migration process of a terminal connected to the third node, receiving, from one of the third node or the second node, a second message including a UE context migration completion indication, and in response to the second message, releasing UE context information of the terminal(s).

In accordance with another aspect of the disclosure, a method performed by a second node in a wireless communication system is provided. The method includes receiving, from a third node, a first message including a UE context migration start indication, the third node having migrated from a first node to the second node, wherein the UE context migration start indication is used to start a UE context migration process of a terminal connected to the third node, transmitting, to the first node, the first message, receiving, from the third node, a second message including a UE context migration completion indication, wherein the UE context migration completion indication is used for releasing UE context information of the terminal, and transmitting, to the first node, the second message.

In accordance with another aspect of the disclosure, a first node in a wireless communication system is provided. The first node includes a transceiver configured to transmit and receive signals, and a processor configured to control the transceiver to perform the aforementioned methods.

In accordance with another aspect of the disclosure, a second node in a wireless communication system is provided. The second node includes a transceiver configured to transmit and receive signals, and a processor configured to control the transceiver to perform the aforementioned methods.

In accordance with another aspect of the disclosure, a third node in a wireless communication system is provided. The third node includes a transceiver configured to transmit and receive signals, and a processor configured to control the transceiver to perform the aforementioned methods.

Optionally, when one of the following conditions is satisfied, it is determined that the third node can migrate to the second node (1) the second message includes a migration acceptance indication and does not include a second migration mode, (2) the second message includes a migration acceptance indication and a second migration mode which can be accepted by the first node, (3) the second message does not include a migration acceptance indication or a migration rejection indication, and includes a second migration mode which can be accepted by the first node. And when one of the following conditions is satisfied, it is determined that the third node cannot migrate to the second node (1) the second message is a specific rejection message, (2) the second message includes a migration rejection indication, (3) the second message includes a migration acceptance indication and a second migration mode which cannot be accepted by the first node, (4) the second message does not include a migration acceptance indication or a migration rejection indication, and includes a second migration mode which cannot be accepted by the first node.

Optionally, it further includes when it is determined that the third node can migrate to the second node, transmitting a migration message to the third node to indicate the third node to migrate.

Optionally, it further includes when it is determined that the third node cannot migrate to the second node, if the second message contains a second migration mode and the second migration mode can be accepted by the first node, transmitting a third message to the second node, the third message indicating a new migration request to migrate the third node, which is connected to the first node, to the second node.

Optionally, each of the first migration mode and the second migration mode includes one or more of a full migration mode and a partial migration mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
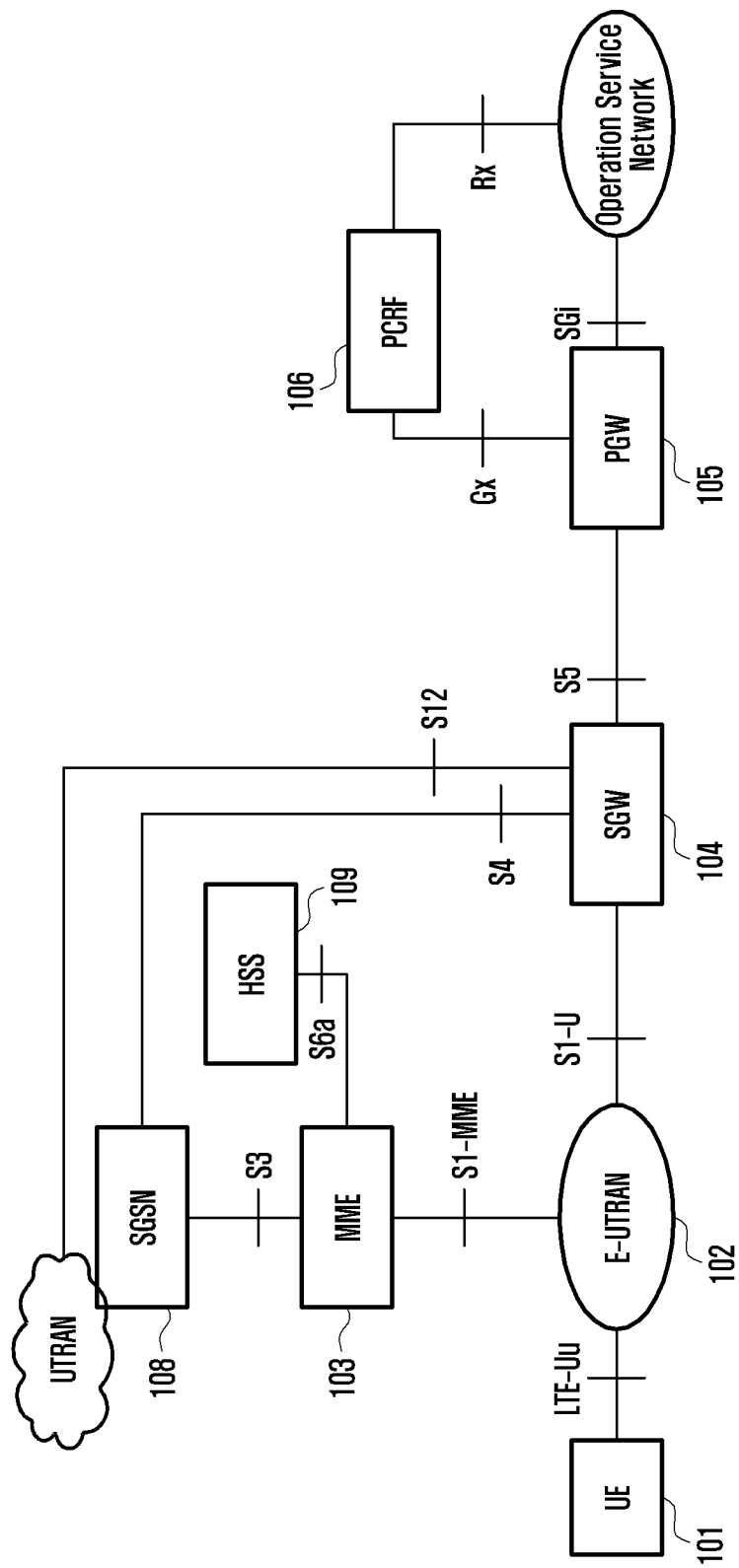
FIG. 1 illustrates a system architecture of system architecture evolution (SAE) according to an embodiment of the disclosure.

FIG. 1 is a system architecture of system architecture evolution (SAE) according to an embodiment of the disclosure.

A user equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of the user plane, and the MME 103 and the SGW 104 may be in a same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
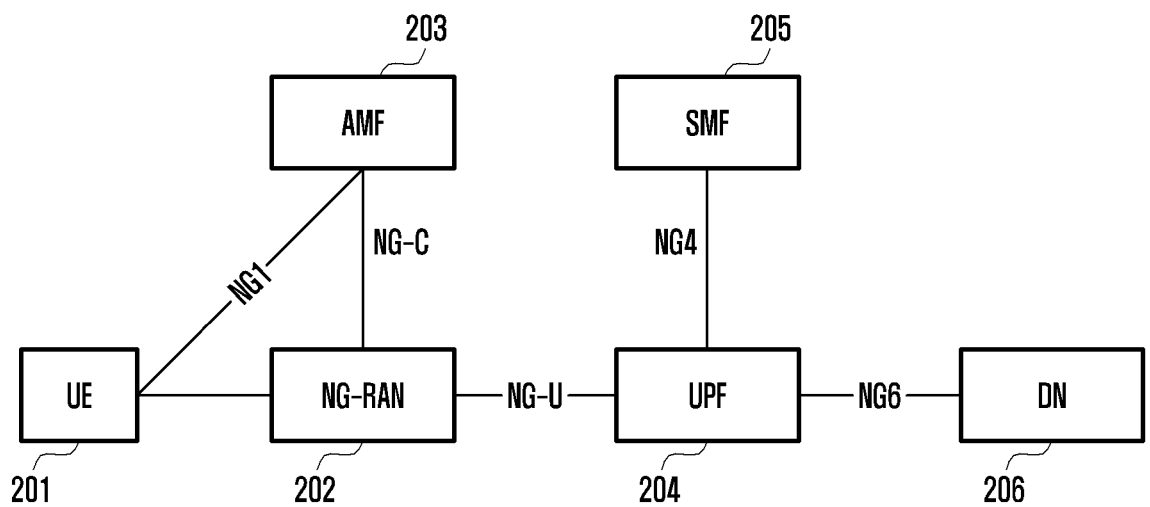
FIG. 2 illustrates a system architecture according to an embodiment of the disclosure.

FIG. 2 is a system architecture according to an embodiment of the disclosure. Other embodiments of the system architecture can be used without departing from the scope of the disclosure.

A user equipment (UE) 201 is a terminal device for receiving data. A next generation radio access network (NG-RAN) 202 is a radio access network, which includes a base station (a next generation node B (gNB) or an evolved node B (eNB) connected to 5G core (5GC) network, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of the user plane. A session management function entity SMF 205 is responsible for session management. A data network (DN) 206 includes, for example, services of operators, access of Internet and services of third parties.

Various embodiments of the disclosure are further described below with reference to the accompanying drawings.

The text and drawings are provided as examples only to help understand the disclosure. They should not be interpreted as limiting the scope of the disclosure in any way. Although certain embodiments and examples have been provided, based on the disclosure herein, it will be apparent to those skilled in the art that changes may be made to the illustrated embodiments and examples without departing from the scope of the disclosure.

In research of New Radio (NR) access network Release 16, in order to extend a coverage of the network, a topic of Integrated Access and Backhaul (IAB) is proposed, the main purpose of which is to build a multi-hop network architecture.

Figure 3:
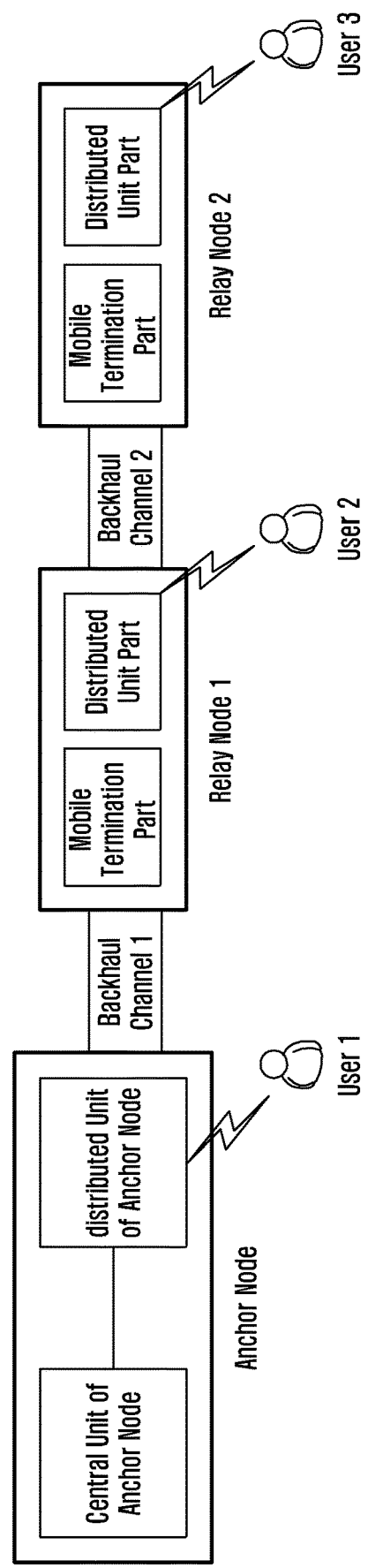
FIG. 3 illustrates a schematic architecture of a multi-hop network according to an embodiment of the disclosure.

FIG. 3 illustrates a schematic architecture of a multi-hop network, which illustrates a network architecture containing an anchor node (IAB donor) and two relay nodes (IAB nodes) according to an embodiment of the disclosure.

Users in the multi-hop network may access the network through the anchor node or a distributed unit of the anchor node or the relay nodes, for example, Users 1/2/3 access the relay network through a distributed unit of the anchor node, a distributed unit part of Relay Node 1 and a distributed unit part of Relay Node 2, respectively. The anchor node may be an independent base station or a base station composed of a central unit (CU) (IAB-donor central unit) and distributed units (DUs) (IAB-donor distributed units). A relay node includes a mobile termination part (MT) and a distributed unit part (DU), in which the mobile termination part is used to communicate with a superior node of the relay node (for example, the mobile termination part of Relay Node 1 is used to communicate with the anchor node or the distributed unit of the anchor node, and the mobile termination part of Relay Node 2 is used to communicate with the distributed unit part of Relay Node 1), and the distributed unit part is used to communicate with an inferior node of the relay node (for example, the distributed unit part of Relay Node 1 is used to communicate with User 2, and may also be used to communicate with the mobile termination part of Relay Node 2). The mobile termination part of a relay node may be regarded as a user accessing the network, so it has functions of an ordinary user (non-relay node) (for example, the mobile termination part may establish a Signaling Radio Bearer (SRB) with its superior node to transmit Radio Resource Control (RRC) messages, or a Data Radio Bearer (DRB) to transmit data). The central unit of an anchor node includes the following protocol stacks: a protocol stack of a service control plane including a radio resource control (RRC) protocol layer and a Packet Data Convergence Protocol (PDCP) layer, and a protocol stack of a service user plane including a Service Data Adaptation Protocol (SDAP) layer and a PDCP layer. The distributed unit of an anchor node or the distributed unit part of a relay node includes the following protocol stacks: protocol stacks of a service control plane and a service user plane, including a Radio Link Control (RLC) protocol layer, a Medium Access Control (MAC) protocol layer and a Physical Layer (PHY). Interfaces between the central unit of an anchor node and the distributed unit of the anchor node, and between the central unit of the anchor node and the distributed unit of a relay node are F1 interfaces (see 3GPP TS38.473).

In the relay network, a link between a relay node and an anchor node or a distributed unit of an anchor node, or between relay nodes, is a backhaul link, on which one or more different backhaul channels will be established, such as Backhaul Channel 1 and Backhaul Channel 2 in FIG. 3. An example of the backhaul channel is the backhaul Radio Link Control protocol layer (RLC) channel, that is, the Backhaul RLC channel. In the relay network, each backhaul channel will be used to transmit data packets belonging to the same user or different users. The data packet may be a user Data Radio Bearer (DRB) data packet, or a user Signaling Radio Bearer (SRB) data packet, or a control plane data packet on the F1 interface, or a user plane data packet on the F1 interface, or a non-F1 interface packet (such as an IP Security (IPSec) packet), a Stream Control Transmission Protocol (SCTP) packet, and an Operation Administration and Maintenance (OAM) packet, etc.).

A process by which a relay node changes its anchor node is called migration or handover. In R16, only the migration of a relay node (IAB node) within an anchor node was considered, and in R17, researches on the migration of the relay node between anchor nodes are introduced.

There are two modes of relay node migration between anchor nodes, such as the following Mode 1 and Mode 2. A relay node may migrate (or handover) from a first anchor node (hereinafter, for convenience of understanding, it may also be referred to as "a source anchor node (or a central unit of the source anchor node, or a control plane part of the central unit of the source anchor node)") to a second anchor node (hereinafter, for convenience of understanding, it may also be referred to as "a target anchor node (or a central unit of the target anchor node, or a control plane part of the central unit of the target anchor node)").

Mode 1: that is, a partial migration or a partial handover or RRC migration or RRC handover or mobile termination part migration (MT migration) or MT handover. In this migration process, the mobile termination part (MT) of the relay node and the target anchor node (or the central unit of the target anchor node, or the control plane part of the central unit of the target anchor node) complete an RRC connection, while the distributed unit part (DU) and the source anchor node (or the central unit of the source anchor node, or the control plane part of the central unit of the source anchor node) maintain an F1 connection.

Mode 2: that is, full migration or full handover or F1 migration or F1 handover or distributed unit part migration (DU migration) or distributed unit part handover (DU handover). In this migration process, both the mobile termination part (MT) and the distributed unit part (DU) of the relay node are connected with the target anchor node (or the central unit of the target anchor node, or the control plane part of the central unit of the target anchor node), and an RRC connection and an F1 connection are completed, respectively.

The source anchor node (or the central unit of the source anchor node, or the control plane part of the central unit of the source anchor node) may migrate relay nodes connected to it to other anchor nodes according to factors such as load situation (load of the node, or load of the DU of the anchor node or load of the backhaul link) and system topology and the like, so as to ensure the continuity of user services.

As mentioned before, currently there are two modes of relay node migration, i.e., partial migration and full migration. In order to ensure a successful migration of the relay node and the terminal(s) it serves, there are still the following problems to be solved:

(1) in different relay migration modes, the relay node needs to perform different operations, so it is necessary to inform the relay node of which handover mechanism to use to ensure the smooth completion of the migration process; and (2) at the same time, since the relay node will connect with the terminal(s) (UE), after the migration of the relay node, the UE(s) connected thereto also needs to be migrated. Therefore, after the relay node migration is completed, it is necessary to start a migration process of the UE(s). It needs to be clarified who triggers the performing of the UE migration process.

Figure 4:
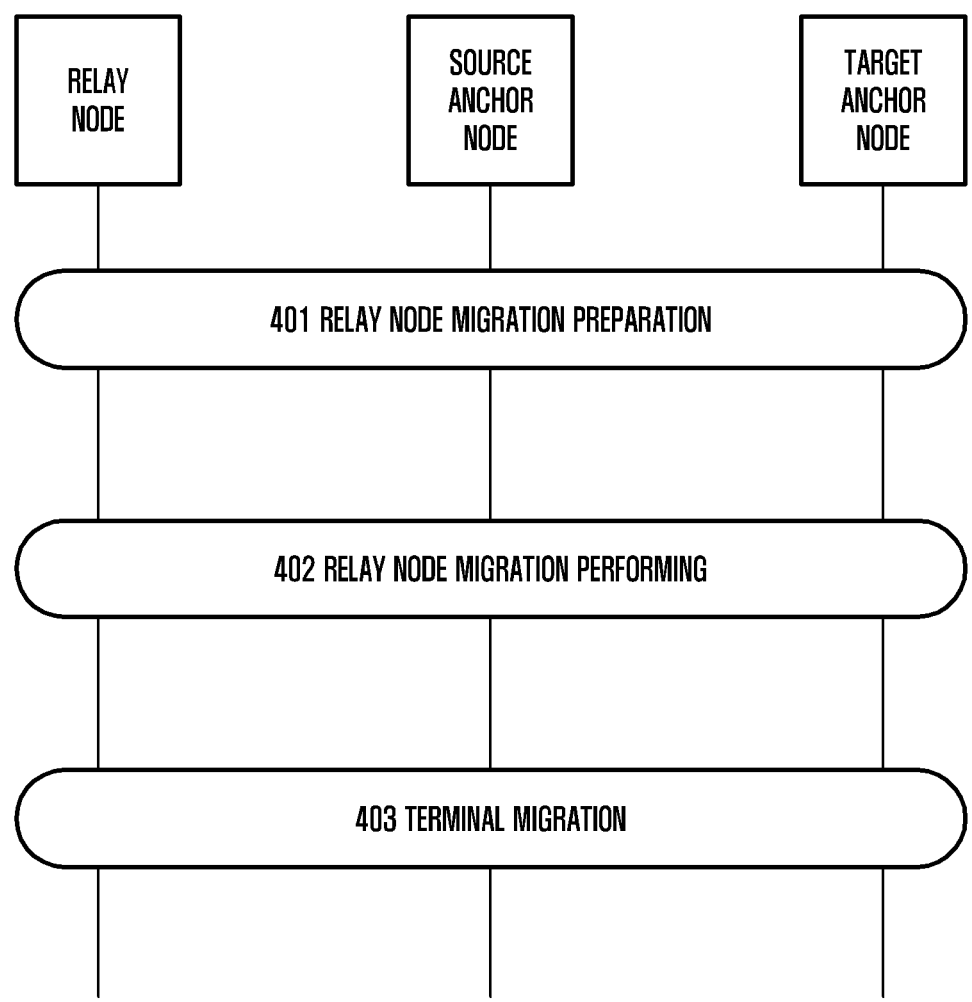
FIG. 4 illustrates a schematic diagram of a relay node migration process according to an embodiment of the disclosure.

FIG. 4 illustrates a schematic diagram of a relay node migration process according to an embodiment of the disclosure.

Several key processes are involved in relay node migration, which include a relay node migration preparation process 401, a relay node migration performing process 402, and UE context migration process 403. Among them:

In the relay node migration preparation process, the source anchor node (or the central unit of the source anchor node, or the control plane part of the central unit of the source anchor node) triggers the relay node to migrate. The disclosure provides a relay node migration mode configuration method, as shown in FIG. 5A.

Figure 5A:
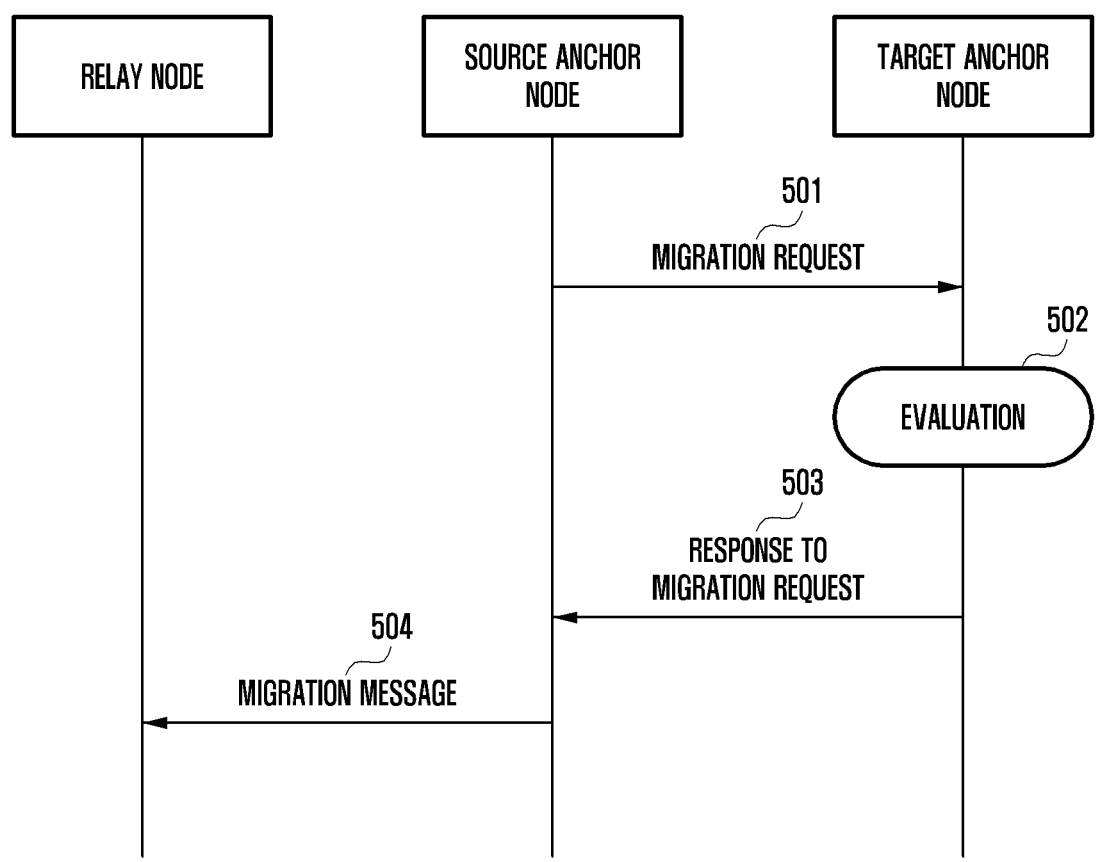
FIG. 5A illustrates a schematic diagram of a relay node migration mode configuration method according to an embodiment of the disclosure.

FIG. 5A illustrates a schematic diagram of a relay node migration mode configuration method according to an embodiment of the disclosure.

In this stage, the source anchor node (or the central unit of the source anchor node, or the control plane part of the central unit of the source anchor node) and the target anchor node (or the central unit of the target anchor node, or the control plane part of the central unit of the target anchor node) exchange messages to determine a handover mode. For example, the source anchor node (or the central unit of the source anchor node, or the control plane part of the central unit of the source anchor node) may transmit a migration request 501 to the target anchor node (or the central unit of the target anchor node, or the control plane part of the central unit of the target anchor node). The target anchor node (or the central unit of the target anchor node, or the control plane part of the central unit of the target anchor node) decides through an evaluation 502 whether to allow the migration of the relay node or select a migration mode for it according to the factors such as load situation and system topology and the like. After determining the migration mode, the target anchor node (or the central unit of the target anchor node, or the control plane part of the central unit of the target anchor node) at operation 503 transmits a response to the migration request to the source anchor node (or the central unit of the source anchor node, or the control plane part of the central unit of the source anchor node). Thereafter, the source anchor node (or the central unit of the source anchor node, or the control plane part of the central unit of the source anchor node) transmits a migration message 504 to the relay node to inform the relay node to migrate.

In the relay node migration process, the relay node determines the migration mode according to the migration message provided by the source anchor node (or the central unit of the source anchor node, or the control plane part of the central unit of the source anchor node) and performs a corresponding migration process. In case of the partial migration, the mobile termination part (MT) of the relay node migrates to the target anchor node (or the central unit of the target anchor node, or the control plane part of the central unit of the target anchor node) and completes an RRC connection, and the distributed unit part (DU) of the relay node and the source anchor node (or the central unit of the source anchor node, or the control plane part and/or user plane part of the central unit of the source anchor node) maintain an F1 connection. In case of the full migration, both the mobile termination part (MT) and the distributed unit part (DU) of the relay node migrate to the target anchor node (or the central unit of the target anchor node, or the control plane part of the central unit of the target anchor node), and an RRC connection and an F1 connection with the target anchor node (or the central unit of the target anchor node or the control plane part and/or user plane part of the central unit of the target anchor node) are completed.

Figure 5B:
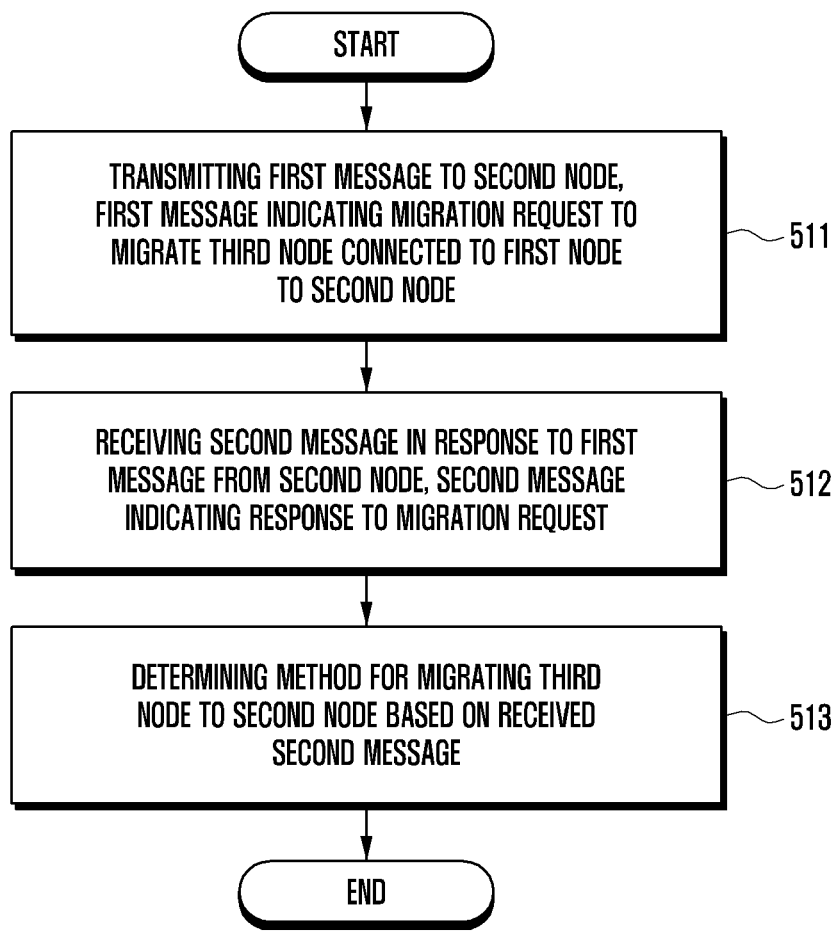
FIG. 5B illustrates a method performed by a first node according to an embodiment of the disclosure.

FIG. 5B illustrates a method performed by a first node according to an embodiment of the disclosure.

At operation 511, the first node transmits a first message to a second node, the first message indicating a migration request to migrate a third node, which is connected to the first node, to the second node. At operation 512, the first node receives a second message in response to the first message from the second node, the second message indicating a response to the migration request. At operation 513, the first node determines a process for migrating the third node to the second node based on the received second message. The first node may be a source anchor node, or a central unit of the source anchor node, or a control plane part of the central unit of the source anchor node. The second node may be a target anchor node, or a central unit of the target anchor node, or a control plane part of the central unit of the target anchor node. The third node may be a relay node. The first message may be a migration request message. The second message may be a migration response message or a migration request rejection message.

Figure 5C:
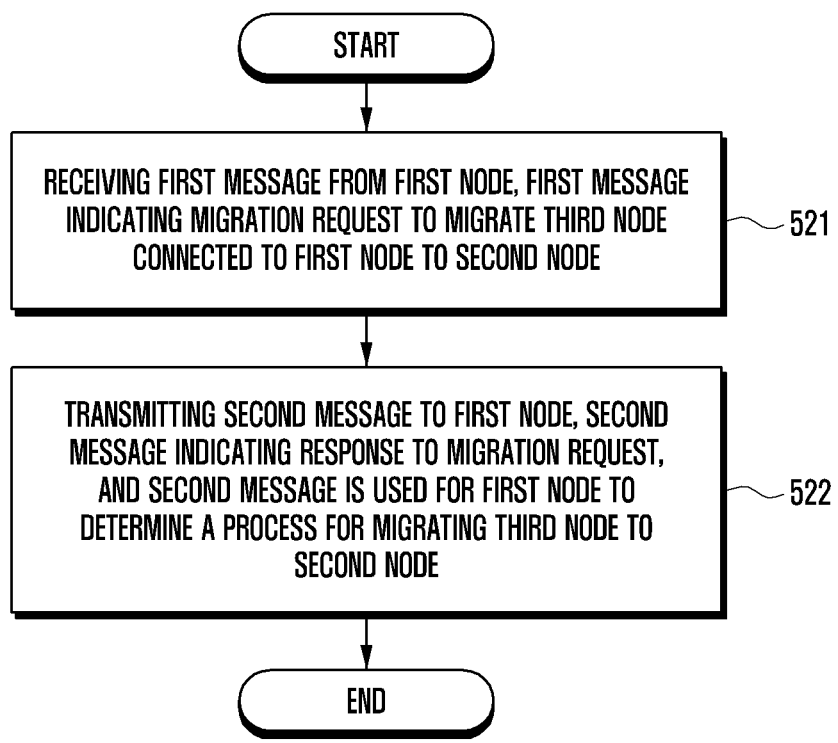
FIG. 5C illustrates a method performed by a second node according to an embodiment of the disclosure.

FIG. 5C illustrates a method performed by a second node according to an embodiment of the disclosure.

At operation 521, the second node receives a first message from a first node, the first message indicating a migration request to migrate a third node, which is connected to the first node, to the second node. In operation 522, the second node transmits a second message to the first node, the second message indicating a response to the migration request, and the second message is used for the first node to determine a process for migrating the third node to the second node. The first node may be a source anchor node, or a central unit of the source anchor node, or a control plane part of the central unit of the source anchor node. The second node may be a target anchor node, or a central unit of the target anchor node, or a control plane part of the central unit of the target anchor node. The third node may be a relay node. The first message may be a migration request message. The second message may be a migration response message or a migration request rejection message.

Figure 6:
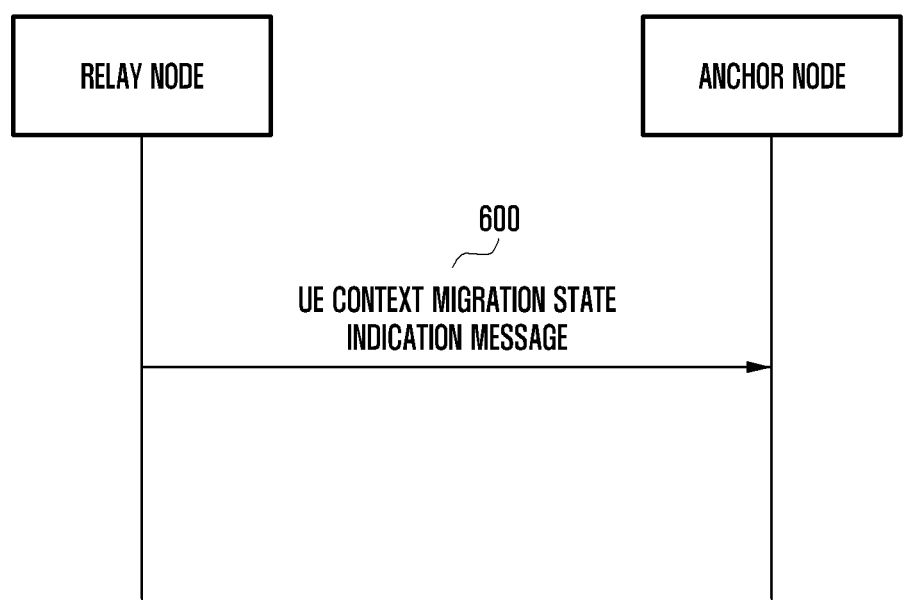
FIG. 6 illustrates a schematic diagram of a UE context migration state indication method according to an embodiment of the disclosure.

In the UE context migration process, the disclosure proposes a terminal (UE) migration state indication method, which improves the reliability of UE context migration, as shown in FIG. 6.

FIG. 6 illustrates a schematic diagram of a UE context migration state indication method according to an embodiment of the disclosure.

After the relay node completes the migration, the relay node will transmit at operation 600 a UE context migration state indication message to the anchor node, indicating that the relay node migration is completed. The anchor node receiving the message may be the target anchor node (or the central unit of the target anchor node, or the control plane part of the central unit of the target anchor node) or the source anchor node (or the central unit of the source anchor node, or the control plane part of the central unit of the source anchor node), which may start the migration of the UE(s) connected to the relay node and determined by the relay node to be in need of migration. The relay node may determine which UE(s) needs to migrate according to factors such as network load. When the UE(s) completes the migration, the relay node will transmit a message to the target anchor node (or the central unit of the target anchor node, or the control plane part of the central unit of the target anchor node), indicating that the UE context migration is completed.

In the disclosure, an anchor node may be a complete base station, a base station including a central unit of an anchor node and a distributed unit of the anchor node, and a base station including a control plane part of the central unit of the anchor node, a user plane part of the central unit of the anchor node and a distributed unit of the anchor node. If the central unit of an anchor node is divided into a control plane part and a user plane part, the central unit of the anchor node in the disclosure is used to indicate the control plane part of the central unit (CU-CP) of the anchor node.

In the disclosure, the relay node is a node including a mobile termination part and a distributed unit part.

In the disclosure, a targeted user may be a terminal user, a relay node or a mobile termination part of the relay node.

In the disclosure, message names are just examples, and messages may be named with other names. A sequence number of a message does not represent an order of execution of the message, but only represents the name of the message.

In the disclosure, the source anchor node (or the central unit of the source anchor node, or the control plane part of the central unit of the source anchor node) may be a first node, the target anchor node (or the central unit of the target anchor node, or the control plane part of the central unit of the target anchor node) may be a second node, and the relay node may be a third node.

Figure 7:
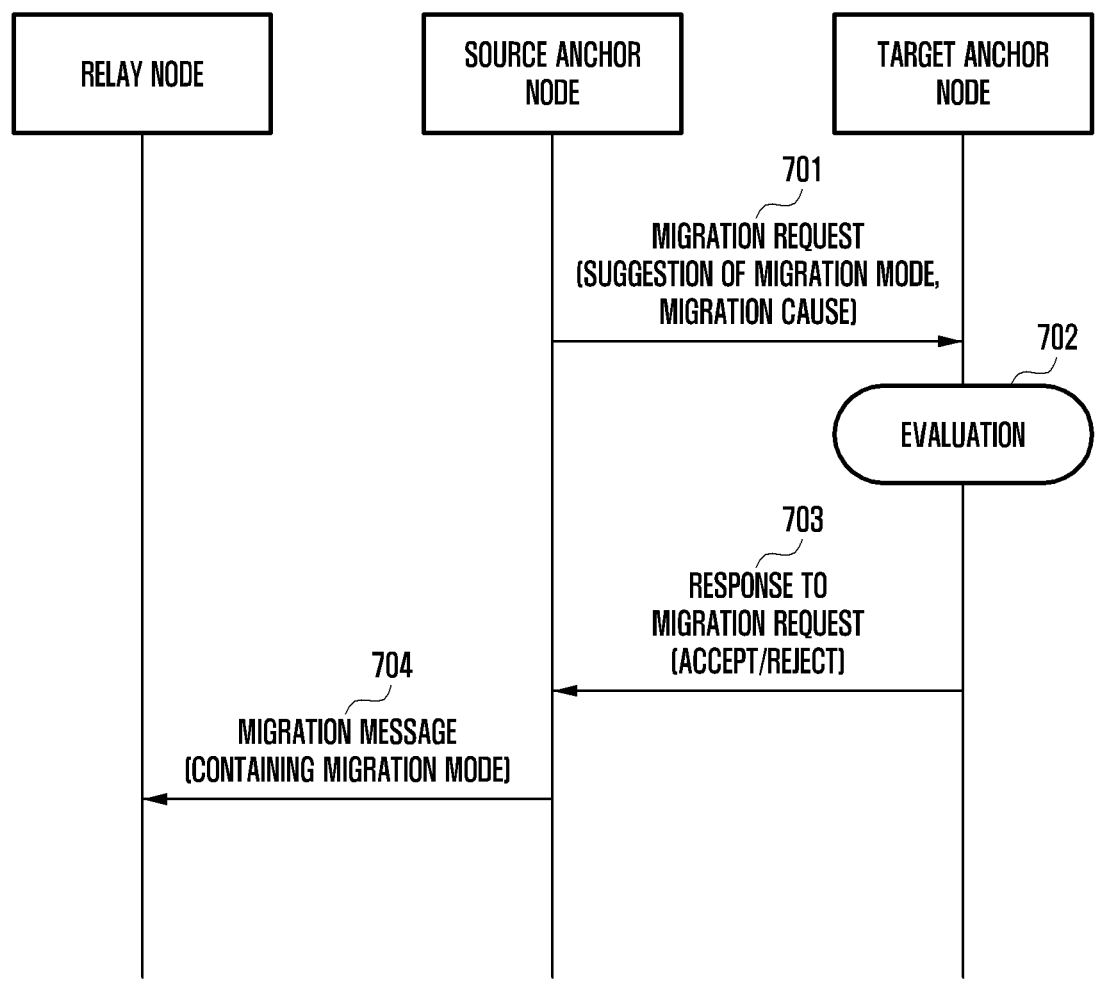
FIG. 7 illustrates a relay node migration mode configuration method according to an embodiment of the disclosure.

FIG. 7 illustrates a relay node migration mode configuration method according to an embodiment of the disclosure.

The disclosure provides a node migration mode configuration method, as shown in Example 1 of a relay node migration mode configuration method in FIG. 7, which includes:

At operation 701, a source anchor node (or a central unit of the source anchor node, or a control plane part of the central unit of the source anchor node) transmits a migration request message to a target anchor node (or a central unit of the target anchor node, or a control plane part of the central unit of the target anchor node) (a central unit of an anchor node or a control plane part of the central unit of the anchor node) for migration response by the target anchor node (or the central unit of the target anchor node, or the control plane part of the central unit of the target anchor node), and the target anchor node (or the central unit of the target anchor node, or the control plane part of the central unit of the target anchor node) performs at operation 703 an evaluation and determines whether migration can be performed according to factors such as the load, topology and the like and based on a migration mode in the received migration request message, and transmits a migration response message to the source anchor node (or the central unit of the source anchor node, or the control plane part of the central unit of the source anchor node) at operation 703. After receiving the migration response message from the target anchor node (or the central unit of the target anchor node, or the control plane part of the central unit of the target anchor node), the source anchor node (or the central unit of the source anchor node, or the control plane part of the central unit of the source anchor node) determines whether the target anchor node (or the central unit of the target anchor node, or the control plane part of the central unit of the target anchor node) accepts the migration request according to the migration response message from the target anchor node (or the central unit of the target anchor node, or the control plane part of the central unit of the target anchor node). If the target anchor node (or the central unit of the target anchor node, or the control plane part of the central unit of the target anchor node) accepts the migration request, then at operation 704, the source anchor node (or the central unit of the source anchor node, or the control plane part of the central unit of the source anchor node) transmits a migration message to the relay node. The relay node starts to perform a corresponding migration process according to the migration mode in the migration message. If the target anchor node (or the central unit of the target anchor node, or the control plane part of the central unit of the target anchor node) rejects the migration request, and if the migration response message contains a new migration mode suggested by the target anchor node (or the central unit of the target anchor node, or the control plane part of the central unit of the target anchor node), the source anchor node (or the central unit of the source anchor node, or the control plane part of the central unit of the source anchor node) may determine whether to initiate a new migration request message (also called a "third message") to the target anchor node (or the central unit of the target anchor node, or the control plane part of the central unit of the target anchor node) according to the suggested new migration mode.

The migration request message may contain one or more of the followings: information of a migration mode suggested by the source anchor node (or the central unit of the source anchor node, or the control plane part of the central unit of the source anchor node) (the suggested migration mode is one of partial migration, full migration, etc.), and a migration cause (including node overload, central unit overload, overload of a control plane part of a central unit, overload of a user plane part of a central unit, backhaul link overload and topology management), etc.

The migration response message may contain one or more of the followings: a migration acceptance indication (accept), a migration rejection indication (reject), a new migration mode suggested by the target anchor node (or the central unit of the target anchor node, or the control plane part of the central unit of the target anchor node), and a rejection cause, etc.

For example, in the case that the target anchor node (or the central unit of the target anchor node, or the control plane part of the central unit of the target anchor node) accepts the migration, a target migration response message may include one of the followings:

(1) a migration acceptance indication (accept);
(2) a migration acceptance indication (accept) and a new migration mode suggested by the target anchor node (or the central unit of the target anchor node, or the control plane part of the central unit of the target anchor node).

The migration acceptance indication (accept) may be either an explicit indication or an implicit indication. When it is an implicit indication, in one embodiment, acceptance of the migration may be expressed by a specific message.

For example, in the case that the target anchor node (or the central unit of the target anchor node, or the control plane part of the central unit of the target anchor node) rejects the migration, a target migration response message may include one of the followings:

(1) a migration rejection indication (reject);
(2) a migration rejection indication (reject) and a rejection cause;
(3) a migration rejection indication (reject) and a new migration mode suggested by the target anchor node (or the central unit of the target anchor node, or the control plane part of the central unit of the target anchor node);
(4) a migration rejection indication (reject), a rejection cause and a new migration mode suggested by the target anchor node (or the central unit of the target anchor node, or the control plane part of the central unit of the target anchor node).

The migration message may contain migration mode information (the migration mode is one of partial migration, full migration, etc.), etc. Optionally, the migration mode information may be in the form of a container, in the form of an information unit (IE) or in other forms. If it is in the form of a container, the source anchor node (or the central unit of the source anchor node, or the control plane part of the central unit of the source anchor node) transmits a container configured by the target anchor node (or the central unit of the target anchor node, or the control plane part of the central unit of the target anchor node) to the relay node transparently; and if it is in the form of an IE, the source anchor node (or the central unit of the source anchor node, or the control plane part of the central unit of the source anchor node) may form an information unit (IE) according to the content of the migration response message transmitted by the target anchor node (or the central unit of the target anchor node, or the control plane part of the central unit of the target anchor node) and transmit it to the relay node.

Optionally, the migration request message may be a handover request (HANDOVER REQUEST) message or other messages;

Optionally, the migration response message may be a handover acknowledge (HANDOVER REQUEST ACKNOWLEDGE) message or other messages;

Optionally, the migration message may be a radio resource control reconfiguration (RRCReconfiguration) message, a radio resource control connection reconfiguration (RRCConnectionReconfiguration) message, or other messages.

Figure 8:
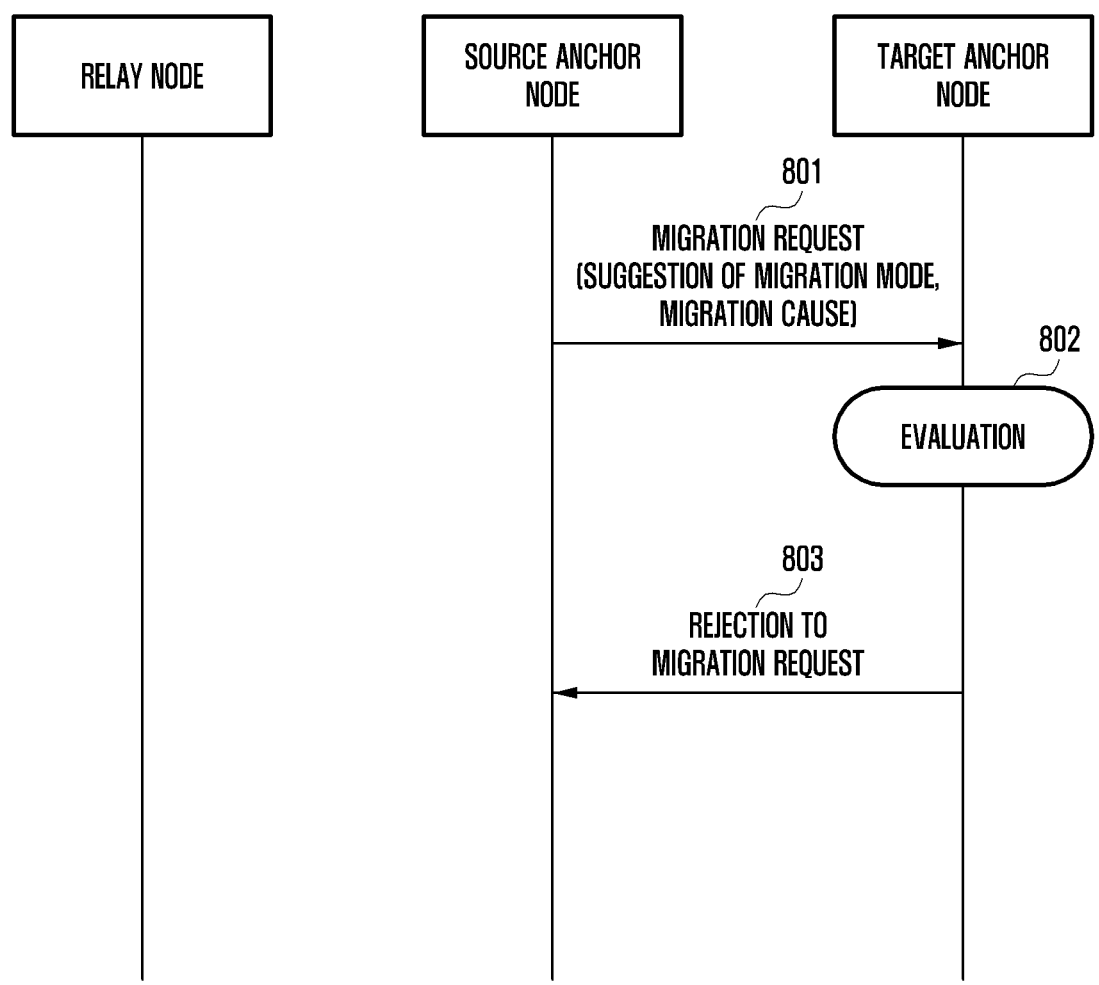
FIG. 8 illustrates a relay node migration mode configuration method according to an embodiment of the disclosure.

FIG. 8 illustrates a relay node migration mode configuration method according to an embodiment of the disclosure.

The disclosure provides another node migration mode configuration method, as shown in Example 2 of a relay node migration mode configuration method in FIG. 8, which includes:

At operation 801, the source anchor node (or the central unit of the source anchor node, or the control plane part of the central unit of the source anchor node) transmits a migration request message to the target anchor node (or the central unit of the target anchor node, or the control plane part of the central unit of the target anchor node) for migration response by the target anchor node (or the central unit of the target anchor node, or the control plane part of the central unit of the target anchor node).

The target anchor node (or the central unit of the target anchor node, or the control plane part of the central unit of the target anchor node) receives a migration mode in the migration request message, and performs at operation 802 an evaluation and determines whether migration can be performed according to factors such as the load, topology and the like and based on a migration mode in the received migration request message. The target anchor node (or the central unit of the target anchor node, or the control plane part of the central unit of the target anchor node) transmits a specific message to the source anchor node (or the central unit of the source anchor node, or the control plane part of the central unit of the source anchor node) by considering factors such as load and topology and the like at operation 803 to indicate rejection of the migration, which may be a migration request rejection message, which may carry an indication of a migration mode suggested for the source anchor node (or the central unit of the source anchor node, or the control plane part of the central unit of the source anchor node) to adopt.

The migration request message contains one or more of the followings: a migration mode suggested by the anchor node (or the central unit of the anchor node or the control plane part of the central unit of the anchor node) (the suggested migration mode is one of partial migration, full migration, etc.), and a migration cause (including node overload, central unit overload, overload of a control plane part of a central unit, overload of a user plane part of a central unit, backhaul link overload and topology management), etc.

The migration request rejection message may contain one or more of the followings: a rejection cause, and suggestion of a new migration mode (the suggested migration mode is one of partial migration, full migration, etc.), etc. If the migration response message contains a new migration mode suggested by the target anchor node (or the central unit of the target anchor node, or the control plane part of the central unit of the target anchor node), the source anchor node (or the central unit of the source anchor node, or the control plane part of the central unit of the source anchor node) may determine whether to initiate a new migration request message to the target anchor node (or the central unit of the target anchor node, or the control plane part of the central unit of the target anchor node) according to the suggested new migration mode.

Optionally, the migration request message may be a handover request (HANDOVER REQUEST) message or other messages.

Optionally, the migration request rejection message may be a HANDOVER PREPARATION FAILURE message or other messages.

Figure 9:
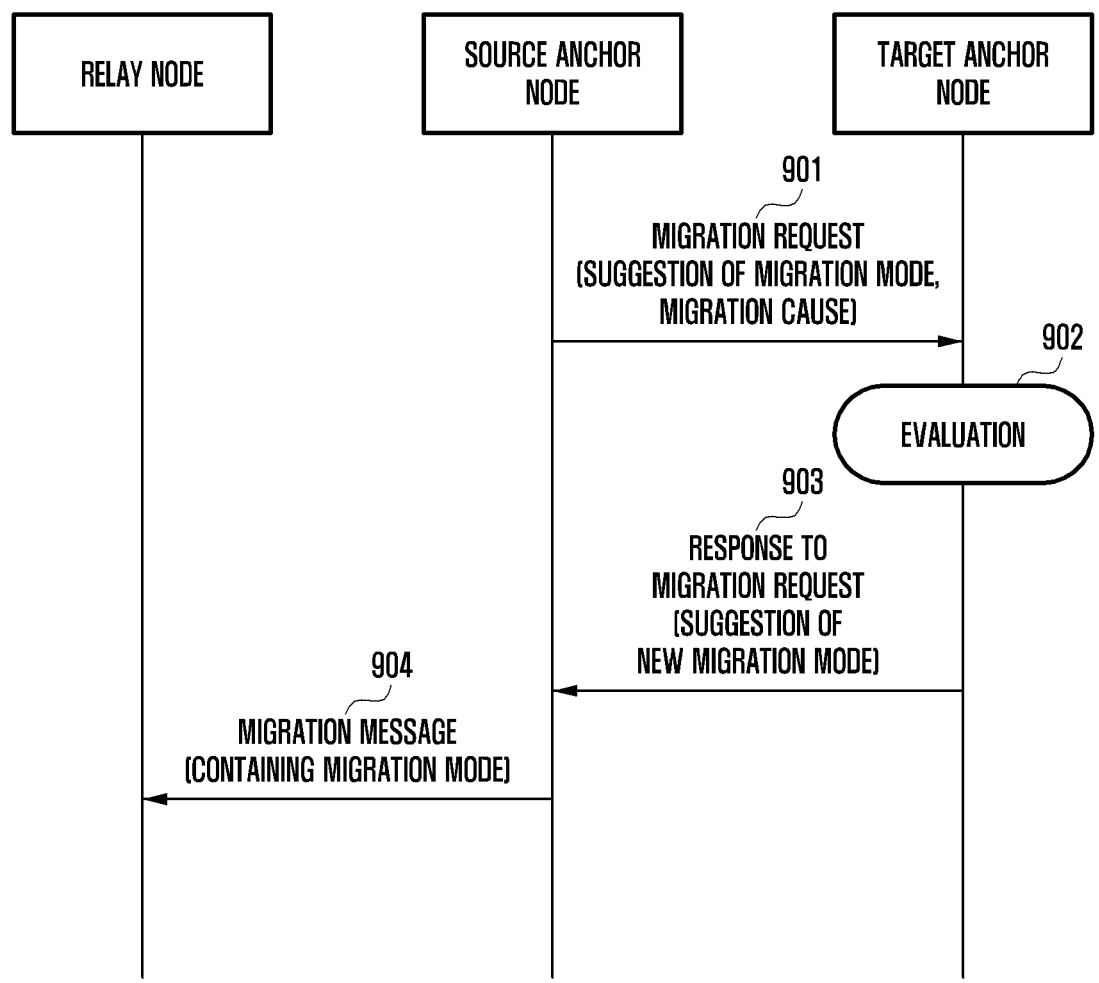
FIG. 9 illustrates a relay node migration mode configuration method according to an embodiment of the disclosure.

FIG. 9 illustrates a relay node migration mode configuration method according to an embodiment of the disclosure.

The disclosure provides another node migration mode configuration method, as shown in Example 3 of a relay node migration mode configuration method in FIG. 9, which includes:

At operation 901, the source anchor node (or the central unit of the source anchor node, or the control plane part of the central unit of the source anchor node) transmits a migration request message to the target anchor node (or the central unit of the target anchor node, or the control plane part of the central unit of the target anchor node) for migration response by the target anchor node (or the central unit of the target anchor node, or the control plane part of the central unit of the target anchor node).

The target anchor node (or the central unit of the target anchor node, or the control plane part of the central unit of the target anchor node) receives a migration mode in the migration request message, an in operation 902 performs an evaluation and determines according to factors such as load, topology, etc., and finds that the requested migration mode is not applicable, with respect to the source anchor node (or the central unit of the source anchor node, or the control plane part of the central unit of the source anchor node), and transmits a migration response message to the source anchor node (or the central unit of the source anchor node, or the control plane part of the central unit of the source anchor node) at operation 903 to indicate a new migration mode. After receiving the migration response message from the target anchor node (or the central unit of the target anchor node, or the control plane part of the central unit of the target anchor node), the source anchor node (or the central unit of the source anchor node, or the control plane part of the central unit of the source anchor node) determines whether the new migration mode indicated in the migration response message is acceptable according to the migration response message from the target anchor node (or the central unit of the target anchor node, or the control plane part of the central unit of the target anchor node). If it is acceptable, in operation 904, the source anchor node (or the central unit of the source anchor node, or the control plane part of the central unit of the source anchor node) transmits a migration message containing the new migration mode to the relay node, and the relay node starts to perform a corresponding migration process according to the new migration mode in the migration message.

The migration request message may contain one or more of the followings: information of a migration mode suggested by the anchor node (or the central unit of the anchor node or the control plane part of the central unit of the anchor node) (the suggested migration mode is one of partial migration, full migration, etc.), and a migration cause (including node overload, central unit overload, overload of a control plane part of a central unit, overload of a user plane part of a central unit, backhaul link overload and topology management), etc.

The migration response message may contain suggestion of a new migration mode (the suggested new migration mode is one of partial migration, full migration, etc.), etc.

The migration request message may contain migration mode information (the migration mode is one of partial migration, full migration, etc.), etc. Optionally, the migration mode information may be in the form of a container, in the form of an information unit (IE) or in other forms. If it is in the form of a container, the source anchor node (or the central unit of the source anchor node, or the control plane part of the central unit of the source anchor node) transmits a container configured by the target anchor node (or the central unit of the target anchor node, or the control plane part of the central unit of the target anchor node) to the relay node transparently; and if it is in the form of an IE, the source anchor node (or the central unit of the source anchor node, or the control plane part of the central unit of the source anchor node) may form an information unit (IE) according to the content of the migration response message transmitted by the target anchor node (or the central unit of the target anchor node, or the control plane part of the central unit of the target anchor node) and transmit it to the relay node.

Optionally, the migration request message may be a HANDOVER REQUEST message or other messages;

Optionally, the migration response message may be a HANDOVER REQUEST ACKNOWLEDGE message or other messages;

Optionally, the migration message may be a radio resource control reconfiguration (RRCReconfiguration) message, a radio resource control connection reconfiguration (RRCConnectionReconfiguration) message, or other messages.

The disclosure proposes a terminal (UE) migration state indication method, which includes:

According to the schematic diagram of a UE context migration state indication method in FIG. 6, a relay node transmits a UE context migration state indication message to an anchor node to indicate the state of UE context migration, where the anchor node may be a source anchor node (or a central unit of the source anchor node, or a control plane part of the central unit of the source anchor node) or a target anchor node (or a central unit of the target anchor node, or a control plane part of the central unit of the target anchor node):

after the relay node completes the migration, the relay node may determine which terminals will be migrated (for example, according to the network state), and then transmit a UE context migration state indication message (also called a "fourth message") to the anchor node for the terminals that are determined to be migrated, indicating that a UE context migration process may be started, and will start the UE context migration process; and when the UE context migration process is completed, the relay node will transmit a UE context migration state indication message (also called a "fifth message") to the anchor node, indicating that the migration process of the terminal(s) has been completed. The migrated terminals may be all terminals accessing the relay node or a portion of terminals accessing the relay node.

Optionally, if the anchor node to which the relay node transmits the UE context migration state indication message (also called a "fourth message") indicating that the UE context migration process may be started is the target anchor node (or the central unit of the target anchor node, or the control plane part of the central unit of the target anchor node), then the target anchor node (or the central unit of the target anchor node, or the control plane part of the central unit of the target anchor node) needs to transmit a message (for example, a UE context migration start indication) to the source anchor node (or the central unit of the source anchor node, or the control plane part of the central unit of the source anchor node), indicating that it may start performing the UE context migration process;

if the anchor node to which the relay node transmits the UE context migration state indication message indicating that the UE context migration process may be started is the source anchor node (or the central unit of the source anchor node, or the control plane part of the central unit of the source anchor node), then the source anchor node (or the central unit of the source anchor node, or the control plane part of the central unit of the source anchor node) starts performing a process of migrating the UE context to the target anchor node (or the central unit of the target anchor node, or the control plane part of the central unit of the target anchor node); and if the anchor node to which the relay node transmits the UE context migration state indication message (also called a "fifth message") indicating that the migration process of the terminal(s) has been completed is the target anchor node (or the central unit of the target anchor node, or the control plane part of the central unit of the target anchor node), then the target anchor node (or the central unit of the target anchor node, or the control plane part of the central unit of the target anchor node) needs to transmit a message (for example, a UE context migration completion indication) to the source anchor node (or the central unit of the source anchor node, or the control plane part of the central unit of the source anchor node) to inform it that the UE context migration process is completed, and the information such as the UE context may be released;

The UE context migration state indication message contains: a UE context migration start indication, a UE context migration completion indication and the other information.

The UE context migration state indication message may be an RRC message or an F1 message, or the other messages.

Technical schemes provided by embodiments of the disclosure at least has the following beneficial effects.

Through the message interaction among the source anchor node (or the central unit of the source anchor node, or the control plane part of the central unit of the source anchor node), the target anchor node (or the central unit of the target anchor node, or the control plane part of the central unit of the target anchor node) and the relay node, a reasonable relay node migration mode is determined, and the corresponding migration mode is informed to the relay node to perform a corresponding migration process. Thereby the load balance of network nodes is realized, and the overhead of network node management and system complexity is also reduced.

At the same time, by means of that the relay node transmits a message to the source anchor node (or the central unit of the source anchor node, or the control plane part of the central unit of the source anchor node) or the target anchor node (or the central unit of the target anchor node, or the control plane part of the central unit of the target anchor node) to indicate the UE context migration state, the reliability of the UE context migration and the service continuity is ensured.

Figure 10:
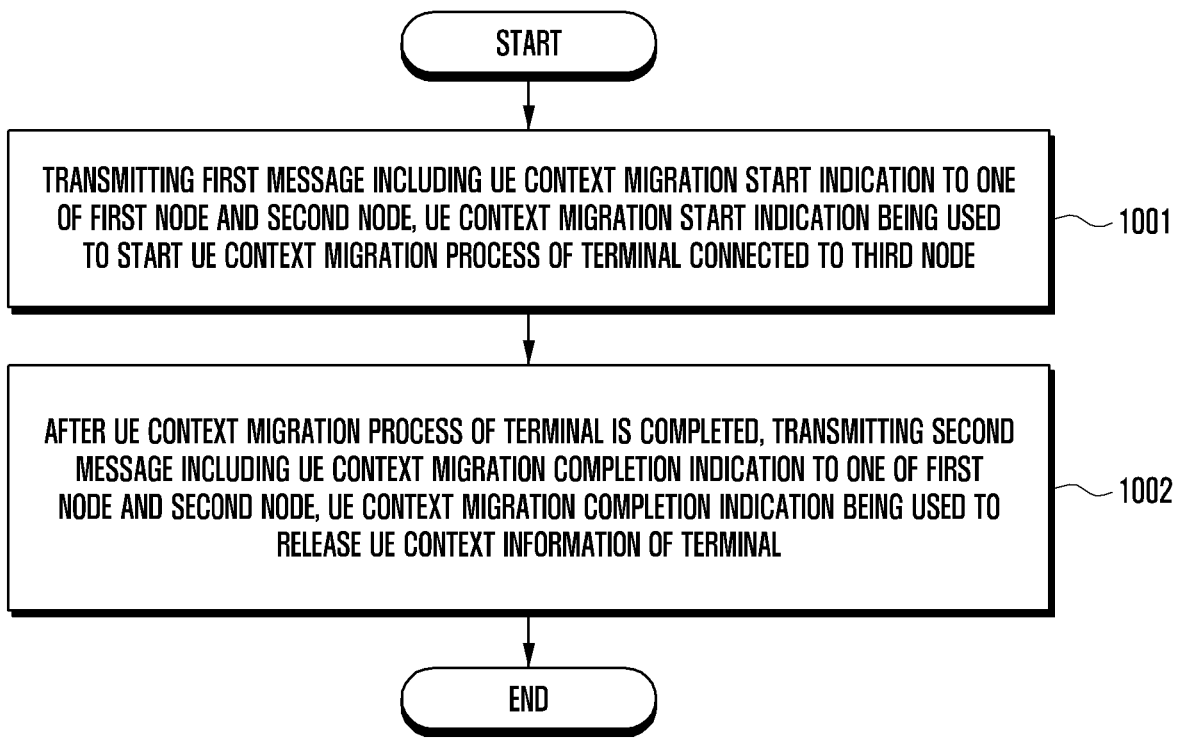
FIG. 10 illustrates a method performed by a third node according to an embodiment of the disclosure.

FIG. 10 illustrates a method performed by a third node according to an embodiment of the disclosure.

At operation 1001, the third node transmits a first message including a UE context migration start indication to one of a first node and a second node, where the UE context migration start indication is used to start a UE context migration process of the terminal(s) connected to the third node. At operation 1002, after the UE context migration process of the terminal is completed, the third node transmits a second message including a UE context migration completion indication to one of the first node and the second node, where the UE context migration completion indication is used to release the UE context information of the terminal. The first node may be a source anchor node, or a central unit of the source anchor node, or a control plane part of the central unit of the source anchor node. The second node may be a target anchor node, or a central unit of the target anchor node, or a control plane part of the central unit of the target anchor node. The third node may be a relay node. The first message may be a migration request message. The second message may be a migration response message or a migration request rejection message.

Figure 11:
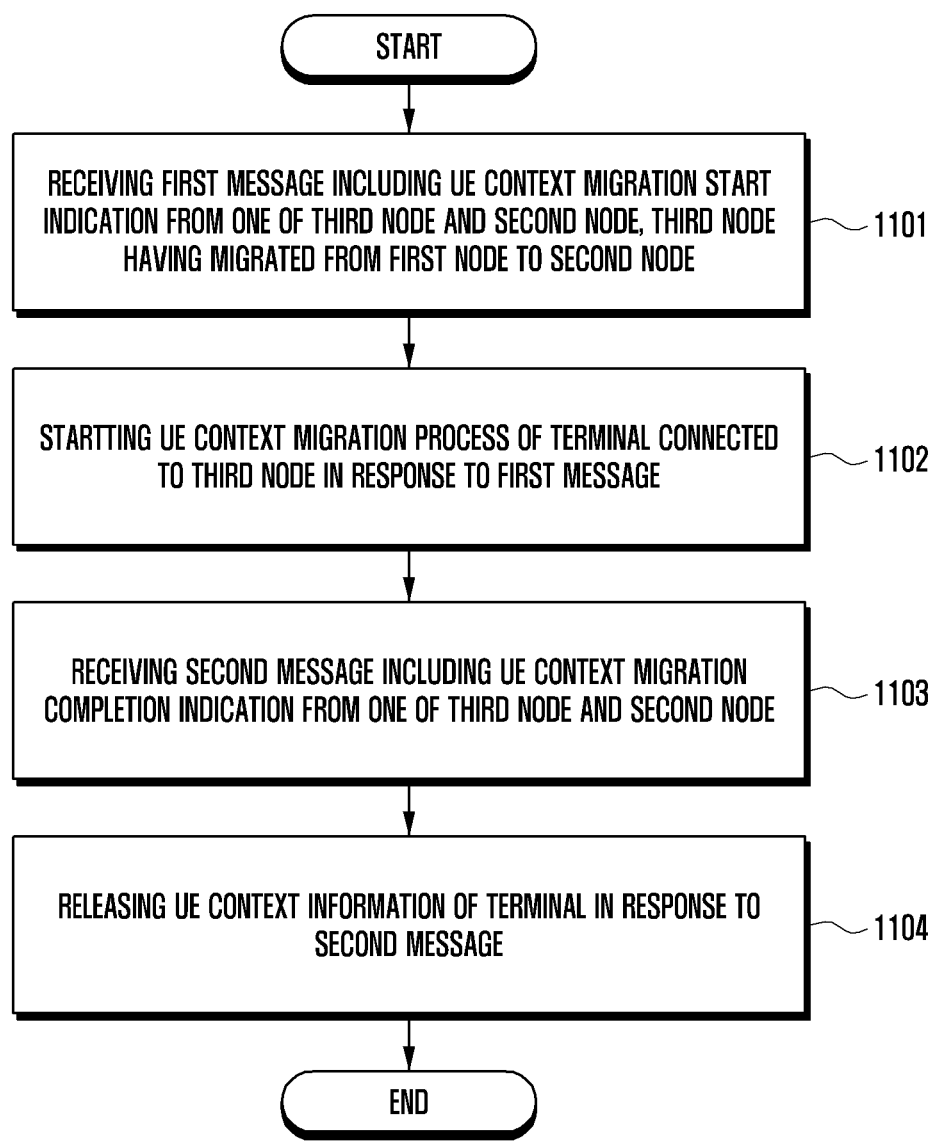
FIG. 11 illustrates a method performed by a first node according to an embodiment of the disclosure.

FIG. 11 illustrates a method performed by a first node according to an embodiment of the disclosure.

At operation 1101, the first node receives a first message including a UE context migration start indication from one of a third node and a second node, where the third node has migrated from the first node to the second node. At operation 1102, the first node starts a UE context migration process of the terminal(s) connected to the third node in response to the first message. At operation 1103, the first node receives a second message including a UE context migration completion indication from one of the third node or the second node. At operation 1104, the first node releases UE context information of the terminal in response to the second message. The first node may be a source anchor node, or a central unit of the source anchor node, or a control plane part of the central unit of the source anchor node. The second node may be a target anchor node, or a central unit of the target anchor node, or a control plane part of the central unit of the target anchor node. The third node may be a relay node. The first message may be a migration request message. The second message may be a migration response message or a migration request rejection message.

Figure 12:
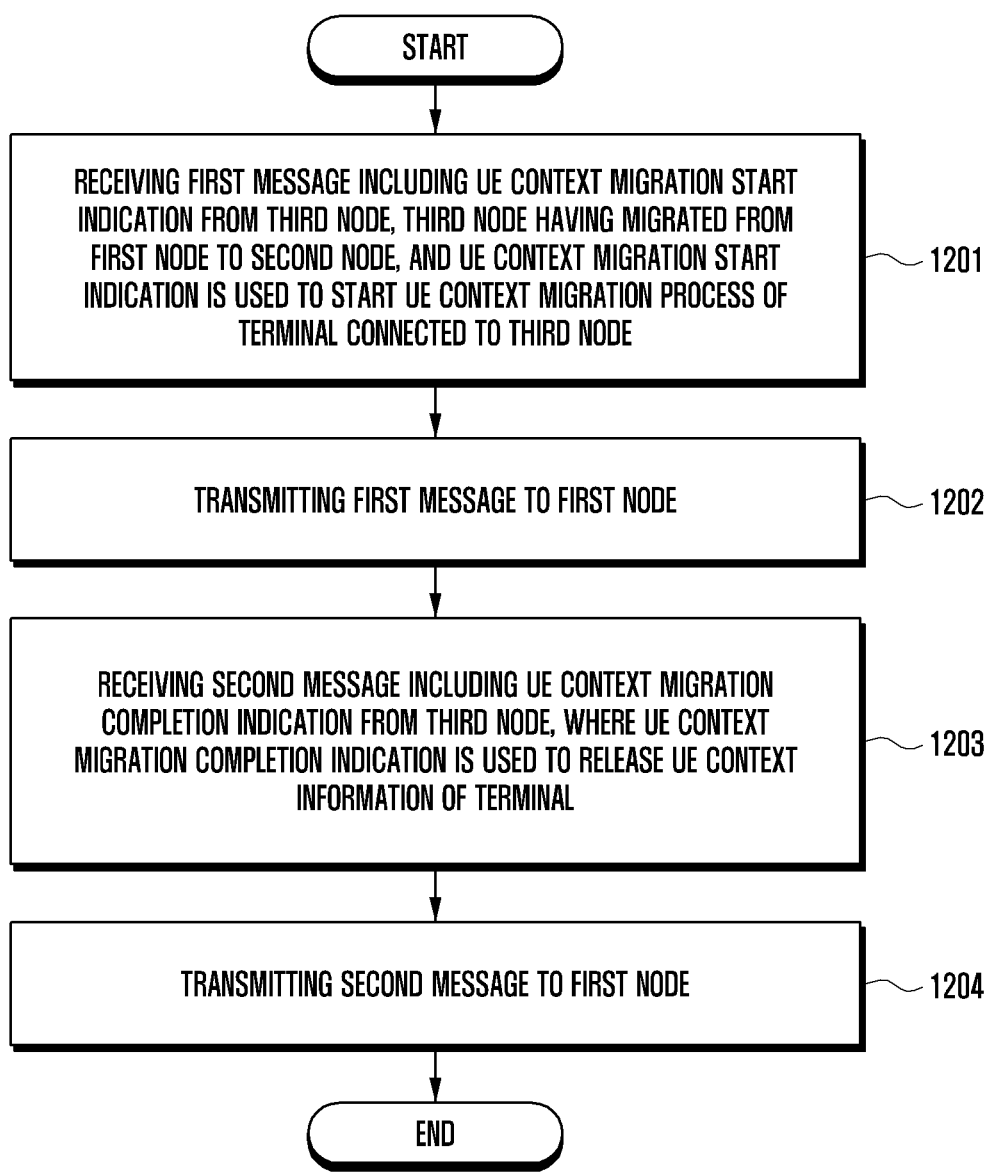
FIG. 12 illustrates a method performed by a second node according to an embodiment of the disclosure.

FIG. 12 illustrates a method performed by a second node according to an embodiment of the disclosure.

At operation 1201, the second node receives a first message including a UE context migration start indication from a third node, where the third node has migrated from a first node to the second node, and the UE context migration start indication is used to start a UE context migration process of the terminal(s) connected to the third node. At operation 1202, the second node transmits the first message to the first node. At operation 1203, the second node receives a second message including a UE context migration completion indication from the third node, where the UE context migration completion indication is used to release UE context information of the terminal(s). At operation 1204, the second node transmits the second message to the first node. The first node may be a source anchor node, or a central unit of the source anchor node, or a control plane part of the central unit of the source anchor node. The second node may be a target anchor node, or a central unit of the target anchor node, or a control plane part of the central unit of the target anchor node. The third node may be a relay node. The first message may be a migration request message. The second message may be a migration response message or a migration request rejection message.

Figure 13:
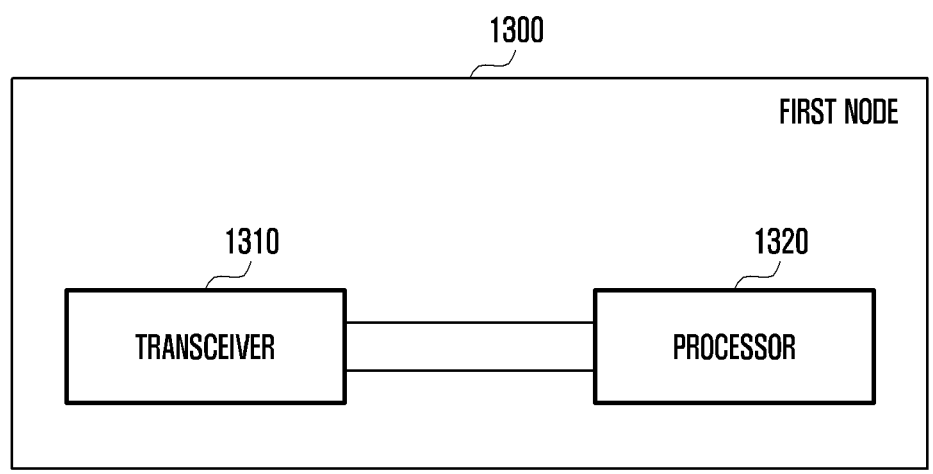
FIG. 13 illustrates a structure of a first node according to an embodiment of the disclosure.

FIG. 13 is a block diagram illustrating a structure of a first node according to an embodiment of the disclosure.

Referring to FIG. 13, the first node 1300 includes a transceiver 1310 and a processor 1320. The first node may be a source anchor node, or a central unit of the source anchor node, or a control plane part of the central unit of the source anchor node.

The transceiver 1310 may be configured to transmit signals to and/or receive signals from the outside. The processor 1320 may be configured to control the transceiver to implement the methods described in the disclosure. The first node 1300 may be implemented in the form of hardware, software or a combination thereof to enable it to perform any one or more steps of any method described in the disclosure.

Figure 14:
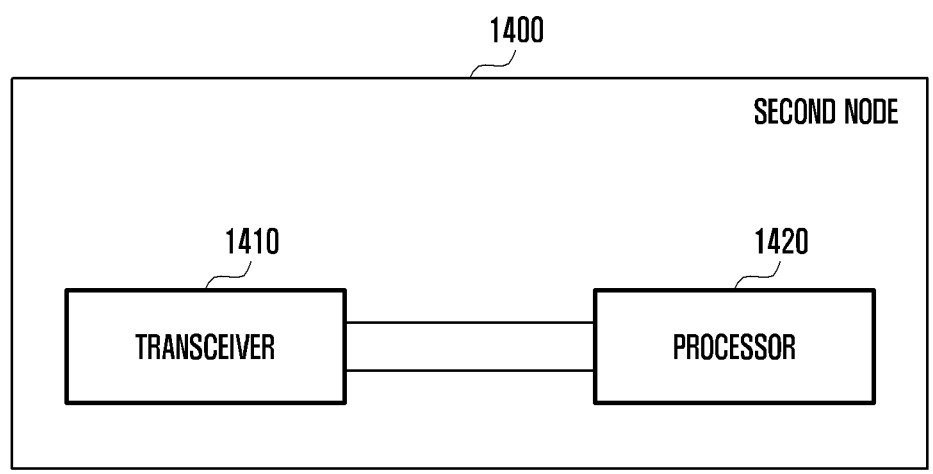
FIG. 14 illustrates a structure of a second node according to an embodiment of the disclosure.

FIG. 14 is a block diagram illustrating a structure of a second node according to an embodiment of the disclosure. The second node may be a target anchor node, or a central unit of the target anchor node, or a control plane part of the central unit of the target anchor node.

Referring to FIG. 14, the second node 1400 includes a transceiver 1410 and a processor 1420.

The transceiver 1410 may be configured to transmit signals to and/or receive signals from the outside. The processor 1420 may be configured to control the transceiver to implement the methods described in the disclosure. The second node 1400 may be implemented in the form of hardware, software or a combination thereof to enable it to perform any one or more steps of any method described in the disclosure.

Figure 15:
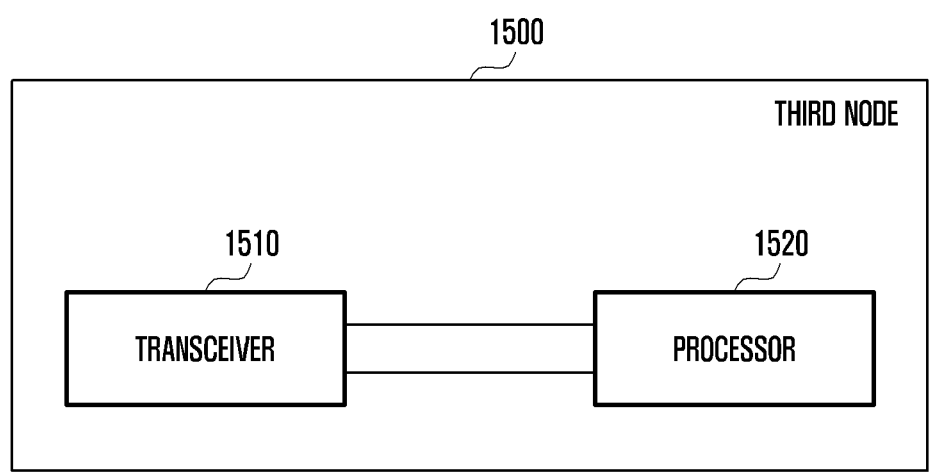
FIG. 15 illustrates a structure of a third node according to an embodiment of the disclosure.

FIG. 15 is a block diagram illustrating a structure of a third node according to an embodiment of the disclosure.

Referring to FIG. 15, the third node 1500 includes a transceiver 1510 and a processor 1520. The third node may be a relay node.

The transceiver 1510 may be configured to transmit signals to and/or receive signals from the outside. The processor 1520 may be configured to control the transceiver to implement the methods described in the disclosure. The third node 1500 may be implemented in the form of hardware, software or a combination thereof to enable it to perform any one or more steps of any method described in the disclosure.

Various embodiments of the disclosure may be implemented as computer-readable codes embodied on a computer-readable recording medium from a specific perspective. The computer-readable recording medium is any data storage device that can store data readable by a computer system. Examples of the computer-readable recording medium may include read-only memory (ROM), random access memory (RAM), compact disc read-only memory (CD-ROM), magnetic tape, floppy disk, optical data storage device, carrier wave (e.g., data transmission via the Internet), and the like. Computer-readable recording media can be distributed by computer systems connected via a network, and thus computer-readable codes may be stored and executed in a distributed manner. Furthermore, functional programs, codes, and code segments for implementing various embodiments of the disclosure can be easily explained by those skilled in the art to which the embodiments of the disclosure are applied.

It will be understood that embodiments of the disclosure may be implemented in hardware, software, or a combination of hardware and software. Software may be stored as program instructions or computer-readable codes executable on a processor on a non-transitory computer-readable medium. Examples of non-transitory computer-readable recording media include magnetic storage media (e.g., ROM, floppy disk, hard disk, etc.) and optical recording media (e.g., CD-ROM, digital versatile disc (DVD), etc.). The non-transitory computer-readable recording medium may also be distributed on computer systems coupled by a network, so that the computer-readable codes may be stored and executed in a distributed manner. The medium may be read by a computer, stored in a memory, and executed by a processor. The various embodiments may be implemented by a computer or a portable terminal including a controller and a memory, and the memory may be an example of a non-transitory computer-readable recording medium suitable for storing program (s) having instructions to implement the embodiments of the disclosure. The disclosure can be realized by a program having codes for specifically implementing the apparatus and method described in the claims, which is stored in a machine (or computer)-readable storage medium. The program may be electronically carried on any medium, such as a communication signal transmitted via a wired or wireless connection, and the disclosure suitably includes equivalents thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a source integrated access and backhaul (IAB) donor node in a communication system, the method comprising:
   transmitting, to a target IAB donor, a request message to request a migration of an IAB node from the source IAB donor to the target IAB donor;
   receiving, from the target IAB donor, a response message based on the request message;
   transmitting, to the IAB node, a first message to migrate the IAB node from the source IAB donor to the target IAB donor;
   receiving, from the IAB node, a second message to indicate a completion of an F1 connection between a distributed unit (DU) of the IAB node and a central unit (CU) of the target IAB donor, based on the first message; and
   performing a handover of a user equipment (UE) served by the IAB node, in response to a reception of the second message.

2. The method of claim 1, wherein the first message includes at least one of first migration mode information or migration cause information.

3. The method of claim 2, wherein the first migration mode information is used to indicate whether a process for migrating the IAB node to the target IAB donor is a partial migration or a full migration.

4. The method of claim 1, wherein the second message includes at least one of a migration acceptance indication, a migration rejection indication, second migration mode information, or rejection cause information.

5. The method of claim 4, wherein the second migration mode information is used to indicate whether a process for migrating the IAB node to the target IAB donor is a partial migration or a full migration.

6. The method of claim 1, wherein a process for migrating the IAB node to the target IAB donor is one of a partial migration or a full migration.

7. The method of claim 1, further comprising:
receiving, from one of the IAB node or the target IAB donor, a third message including a UE context migration start indication; and
starting a UE context migration process of the UE connected to the IAB node.

8. The method of claim 7, further comprising:
receiving, from one of the IAB node or the target IAB donor, a fourth message including a UE context migration completion indication; and
releasing UE context information of the UE.

9. A source integrated access and backhaul (IAB) donor node in a communication system, the source IAB donor node comprising:
a transceiver; and
a processor configured to:
control the transceiver to transmit, to a target IAB donor, a request message to request a migration of an IAB node from the source IAB donor to the target IAB donor,
control the transceiver to receive, from the target IAB donor, a response message based on the request message,
control the transceiver to transmit, to the IAB node, a first message to migrate the IAB node from the source IAB donor to the target IAB donor,
control the transceiver to receive, from the IAB node, a second message to indicate a completion of an F1 connection between a distributed unit (DU) of the IAB node and a central unit (CU) of the target IAB donor, based on the first message, and
perform a handover of a user equipment (UE) served by the IAB node, in response to a reception of the second message.

10. The source IAB donor node of claim 9, wherein the first message includes at least one of first migration mode information or migration cause information.

11. The source IAB donor node of claim 10, wherein the first migration mode information is used to indicate whether a process for migrating the IAB node to the target IAB donor is a partial migration or a full migration.

12. The source IAB donor node of claim 9, wherein the second message includes at least one of a migration acceptance indication, a migration rejection indication, second migration mode information, or rejection cause information.

13. The source IAB donor node of claim 12, wherein the second migration mode information is used to indicate whether a process for migrating the IAB node to the target IAB donor is a partial migration or a full migration.

14. The source IAB donor node of claim 9, wherein a process for migrating the IAB node to the target IAB node-donor is one of a partial migration or a full migration.

15. The source IAB donor node of claim 9, wherein the processor is further configured to:
control the transceiver to receive, from one of the IAB node or the target IAB donor, a third message including a UE context migration start indication, and
start a UE context migration process of the UE connected to the IAB node.

16. The source IAB donor node of claim 15, wherein the processor is further configured to:
control the transceiver to receive, from one of the IAB node or the target IAB donor, a fourth message including a UE context migration completion indication, and
release UE context information of the UE.

* * * * *